United States Patent
Davis

(10) Patent No.: US 10,471,928 B2
(45) Date of Patent: Nov. 12, 2019

(54) SAFETY DEVICE FOR USE WITH A SAFETY HARNESS

(71) Applicant: Catherine Davis, Tonbridge (GB)

(72) Inventor: Catherine Davis, Tonbridge (GB)

( * ) Notice: Subject to any disclaimer, the term of this patent is extended or adjusted under 35 U.S.C. 154(b) by 276 days.

(21) Appl. No.: 15/309,261

(22) PCT Filed: May 7, 2015

(86) PCT No.: PCT/IB2015/053348
§ 371 (c)(1),
(2) Date: Nov. 7, 2016

(87) PCT Pub. No.: WO2015/170279
PCT Pub. Date: Nov. 12, 2015

(65) Prior Publication Data
US 2017/0072902 A1    Mar. 16, 2017

(30) Foreign Application Priority Data
May 8, 2014 (GB) .................. 1408154.1

(51) Int. Cl.
*B60R 22/10* (2006.01)
*B60N 2/26* (2006.01)
*B60R 22/14* (2006.01)

(52) U.S. Cl.
CPC ............ *B60R 22/105* (2013.01); *B60N 2/265* (2013.01); *B60R 22/14* (2013.01)

(58) Field of Classification Search
CPC ....... B60R 22/105; B60R 22/14; B60N 2/265; B60N 2/2803
See application file for complete search history.

(56) References Cited

U.S. PATENT DOCUMENTS

| | | | | |
|---|---|---|---|---|
| 2,908,324 A | * | 10/1959 | Muller | ............... A41D 13/0007 2/102 |
| 4,848,793 A | * | 7/1989 | Huspen | ................. B60R 22/105 280/801.1 |
| 5,161,258 A | * | 11/1992 | Coltrain | ................. A41D 11/00 2/102 |
| 5,325,818 A | | 7/1994 | Leach | |
| 5,354,121 A | * | 10/1994 | Allum | .................. A47D 15/006 297/485 |
| 5,915,789 A | | 6/1999 | Ponce De Leon, III | |

(Continued)

FOREIGN PATENT DOCUMENTS

| | | |
|---|---|---|
| AU | 2009 100 865 | 10/2009 |
| EP | 1 147 717 | 10/2001 |
| EP | 2 332 786 | 6/2011 |

(Continued)

OTHER PUBLICATIONS

International Search Report (ISR) issued Jul. 23, 2015 in International (PCT) Application No. PCT/IB2015/053348.

*Primary Examiner* — David R Dunn
*Assistant Examiner* — Tania Abraham
(74) *Attorney, Agent, or Firm* — William H. Bollman

(57) ABSTRACT

A child safety device for use with a safety harness comprising first and second shoulder straps, the device comprising: an elongate belt comprising fastening means located at or adjacent each end of the belt, and in which each fastening means is arranged in use to fasten an end of the belt in a folded arrangement about a shoulder strap of the harness.

16 Claims, 6 Drawing Sheets

(56) References Cited

U.S. PATENT DOCUMENTS 6,314,578 B1 11/2001 Masuda et al.
2012/0217786 A1* 8/2012 Kim ..................... B60N 2/265
297/465

FOREIGN PATENT DOCUMENTS

| GB | 2 383 979 | 7/2003 |
| GB | 2 415 939 | 1/2006 |
| GB | 2 417 224 | 2/2006 |

* cited by examiner

SAFETY DEVICE FOR USE WITH A SAFETY HARNESS

FIELD OF THE INVENTION

The present invention relates to safety devices, in particular the invention relates to safety harnesses for children. More particularly, but not exclusively the invention relates to devices to hinder or prevent a child or other vulnerable person from escaping from a secured safety harness.

BACKGROUND

A number of devices have been proposed to prevent or hinder a child from escaping from a secured safety harness. Children wear these harnesses. They are donned, for example by passing their arms out from underneath one or more shoulder straps. Most prior art harnesses work by holding the shoulder straps closer together, for example by preventing the child from moving their arms out from between the shoulder straps.

Such safety harnesses have drawbacks, including: fixings may be located at the front of the harness in the vicinity of the child's chest, and are therefore accessible to the child. When presented to the child in an accessible way there is a risk that the child may be able to undo the fixings. In addition the fixings can be prove uncomfortable for the child as the fixings can restrict the space between the straps and hence the child's movements may be limited. Also, as the straps are often joined together, the device needs to be unfastened from the straps in order to place the child into the harness or remove the child therefrom.

There is therefore a need for an improved device to prevent a child from being able to withdraw their arms from under the straps without discomfort and with improved ease of use for a parent or carer.

PRIOR ART

A number of harnesses have been developed in an attempt to address the problem. These include the following:

UK Patent Application GB-A-2417224 (Davidson) discloses: a coupling device for temporarily linking together the shoulder straps of a child safety harness. The device comprises an elongate flexible member providing, on each side of a central region a flat pocket. The pockets can be opened at each end. Each pocket has a lengthwise opening with separable fastening means, whereby the pockets may be opened to receive and to encircle one of a pair of straps.

UK Patent Application GB-A-2415939 (Ryan) discloses: a restraining device for retaining a child in a child restraint system. The child restraint system is of the type having two shoulder straps. The restraining device comprises a pair of sleeves; each sleeve is adapted to receive a shoulder strap, and a connector for the sleeve which is adapted to maintain the shoulder straps in position above a child's shoulders during use. At least one of the sleeves comprises an opening along its length and a fastener for releasably closing the opening.

Also described is a method of restraining a child in a child restraint system using the restraining device of the invention. The sleeves and connector may comprise a piece of fabric, and the releasable fastener may comprise snap fasteners, hook and loop fasteners or a ring type system.

UK Patent Application GB-A-2383979 (Brennan) discloses: a strap-securing device for securing a child safety harness. The device discloses a central panel and first and second foldable panels attached to respective edges of the central panel, the foldable panels being foldable from an open position, in which the device can be placed between a child's chest and a pair of shoulder straps, so forming part of a safety harness in which the child is restrained. In a closed position, the foldable panels overlap one another and sandwich the shoulder straps between a central panel. The foldable panels are removably secured one to another in the closed position.

European Patent Application EP-A-2332786 (Klappa) discloses a fitting for a child's safety harness having two shoulder straps, each shoulder strap includes a chest portion arranged to retain a child.

U.S. Pat. No. 5,915,789 (Ponce De Leon III) discloses a flexible and adjustable harness used by drivers of cranes and earth moving equipment having a slip-on portion and flexible left and right wraps.

The aforementioned harnesses are all variants of a concept for holding shoulder straps together in front of a person. The harnesses intended for children prevent a child from moving its arms out from between the straps at the front of the harness.

It is an object of the invention to overcome the aforementioned problems by providing an improved harness.

SUMMARY OF THE INVENTION

According to a first aspect the present invention provides a safety device for use with a safety harness comprising first and second shoulder straps, the safety device includes: an elongate belt comprising fastening means located at or adjacent each end of the belt, and in which each fastening means is arranged in use to fasten an end of the belt in a folded arrangement about a shoulder strap of the harness.

The present invention therefore provides a convenient, adjustable and comfortable safety device that is readily adapted for use with a range of existing child safety seats and harnesses. Furthermore the present invention can remain fastened prior to removal of the child from a secured safety belt.

Preferably the safety device or device comprises: a fabric belt having a first end, a second end, a front side, a rear side, a top edge and a bottom edge. The length of the belt extends between the first and the second ends of the belt. The width of the belt extends between the top edge and the bottom edge of the belt.

A first fastening means may be located on the rear side of the belt adjacent, or at, each of the first and second ends of the belt. A second fastening means may be arranged to engage the first fastening means. The second fastening means may be provided on the rear side of the belt and spaced apart from the first fastening means.

The second fastening means may be spaced a distance from each of the first and the second ends of the belt. The length of the belt may be greater than the width of the belt. Each end of the belt may be configured to define a fold so as to allow the first and second fastening means to engage each other.

The spacing of the second fastening means from the ends of the belt may be selected so as to allow the shoulder strap of the child's seat harness to pass between the fastening means and the fold.

In some embodiments the device is configured to attach in use to the shoulder straps of a safety harness. For example attachment points may be provided on the shoulder straps of the safety harness to receive the safety device.

The belt may be arranged to pass behind the back of a child restrained by the harness, surrounding the child and holding him or her within the harness.

In this way the device is usable with a child's five-point seat harness that is designed to prevent the child from being able to pull their arm out of a shoulder strap and escape from the seat. The ends of the device pass around the child's back and fix around the front of both of the shoulder straps. The width of the device (the width being substantially vertical in use) defines a space between the underside of the shoulder strap in the region of the shoulder and the top edge of the device that is not sufficient to allow the child to pull their arm back through the space.

Ideally the ends of the device are not joined together in front of the child, allowing the child to be put into the seat and removed from it in the usual way without having to undo a fitting. Additionally when in use, the fastenings of the device are behind the shoulder straps next to the child's body, so hindering or preventing the child from undoing the fastenings, a drawback in prior art devices.

In this way the device is suitable for use on any child seat and/or harness that provides safety straps for retaining a child or adult. For example, but without limitation: a car seat, a push chair, a buggy or a high chair.

In some embodiments the fastening means is a hook and fibre fastener such as Velcro®. For example one of the first and second fastening means is ideally formed from one of the hook or the eye material and the other fastening means includes the other type of material.

In some embodiments the fastening means may be a press-stud and one of the first or the second fastening means is a stud and the other fastening means is the stud receiving part. The device may include multiple such fastening means located at desired spacings along the length and/or width of the belt, preferably along the length of the belt in order to allow selective adjustment of length of the belt. The device may be adjustable to tailor fit it about the child.

In some embodiments the fastening means is/are a snap-in buckle and one of the male and female parts of the buckle is provided mounted on adjacent to the end of the device and the other is mounted on the rear side of the device, for example on a length of fabric stitched to the device.

Ideally the device is configured to fold preferentially at a folding point around midway of the belt, typically between the first and the second fastener parts.

In an alternative embodiment the folding point comprises one or more seams stitched across the width of the belt.

In some embodiments the belt comprises one or more padded portions. The belt may also comprise a non-padded end portion forming each end of the device.

The first fastening means may be provided adjacent each end of the device, for example on the non-padded end portion. The second fastening means may be provided on the rear side of the padded portion. In some such embodiments the length of the non-padded end portion is around half the distance between the fastening means. In this way the folding point is provided by the join between the non-padded and the padded portions.

In some embodiments the device comprises an elastic portion extending across the whole width of the belt between the two ends. In some embodiments the elastic portion may only extend across part of the belt.

In another embodiment an elasticated portion may be provided substantially centrally on the belt between the two ends, or in other intermediate parts of the belt.

In some embodiments the padded portion of the device is adapted to fold down at the top edge such that the top edge is adjacent to the front side of the device.

In an alternative embodiment a seam is provided parallel to and spaced apart from the top edge such that the padding is divided along the seam, so as to facilitate folding.

Optionally the padded portion comprises a lower and an upper padded region separated parallel to the top edge and joined by a strip of non-padded fabric, such that the upper padded region is adapted to fold down onto the lower padded region.

In an alternative embodiment the device comprises three or more separate padded regions, separated by a non-padded region parallel to the top edge.

In some embodiments the elastic portion is adapted to fold in the same manner.

Preferably the fabric is adapted to be breathable.

In some embodiments the device comprises one or more regions having a plurality of apertures through the device, such as a mesh region. In some such embodiments a mesh region comprises a mesh fabric.

In some embodiments the device comprises one or more pockets.

Typically one or more pockets may be provided on the rear side so as to store items such as an item of clothing, tissues or baby wipes.

In some embodiments the pocket(s) is/are provided on the rear side between the second fastening means and a point midway between the first and second fastening means. In this way the pocket lies adjacent to the child's seat strap in use.

In some embodiments the device comprises an article of clothing attached to the device and configured to be folded into and out from the pocket.

In alternative embodiments the article of clothing is a high visibility item, such as a high visibility arm-band, a vest, a tunic or jacket.

The article of clothing may comprise a high visibility jacket for a car seat, a rain coat for a buggy or an apron for use on a highchair.

The article of clothing may be permanently attached to the device adjacent to the opening of the pocket, for example stitched in place, or may be removably attached for example by means of Velcro®. In some embodiments the device comprises a first and a second pocket adjacent to each end and the article of clothing comprises a left and a right hand part, each part being attached to the device near one of the pockets and configured to be stored within the pocket. In some such embodiments the clothing parts comprise one or more fastening means to join them together.

In this way a high visibility article of clothing is available for the child to wear in case of an accident.

In some embodiments the device comprises a further fastener means configured to allow the device to be worn in the manner of a continuous belt.

Ideally the further fastener means comprises a first and a second fastener parts adapted to fasten together, provided adjacent to the ends of the padded portions of the device. In this way the child may wear the device as a belt when removed from the seat. In some embodiments the device is adapted to be worn as a belt while the article of clothing is being worn.

In other embodiments the device comprises multiple panels of fabric stitched together. In some embodiments the device comprises a region of high visibility fabric, for example in the form of a strip running along a portion of the length of the device.

According to a second aspect of the invention there is provided a child's safety seat comprising two shoulder straps and a safety device as described herein. In some embodiments the shoulder straps form part of a multi-point harness; such as those used for safety with respect to a child's or other vulnerable person's chair, buggy, car seat, high chair or similar.

According to a third aspect the invention provides a method for seating a child in a safety seat, the seat has a pair of shoulder straps and using a device as described herein comprising the steps of: fixing the first and the second ends of the device around the shoulder straps, the front of the device facing forwards and the ends folded around each shoulder strap and the fastener parts fastened together; placing a child in the seat with a portion of the device adjacent to its back; and fastening the shoulder straps to restrain the child within the seat.

In this way the child is held with its arms between the underside of the shoulder straps and the top edge of the device, the space therebetween being too small for the child to fold its arms to pull its hands back through the space.

Optionally the method comprises the step of folding an upper part of the device adjacent to the upper edge to adjust the width of the device.

In a further aspect of the present invention the device may be incorporated in and supplied with a safety seat or harness. For example the device may at least in part be permanently fixed to or on the seat or integrated into a car seat. An example is a chair or seat as having at least one end permanently fastened or having a rear portion fastened onto or extending from the seat permanently or semi-permanently attached thereto.

Preferred embodiments of the invention will now be described by way of examples only and with reference to the Figures in which:

DETAILED DESCRIPTION OF FIGURES

Figure 1:
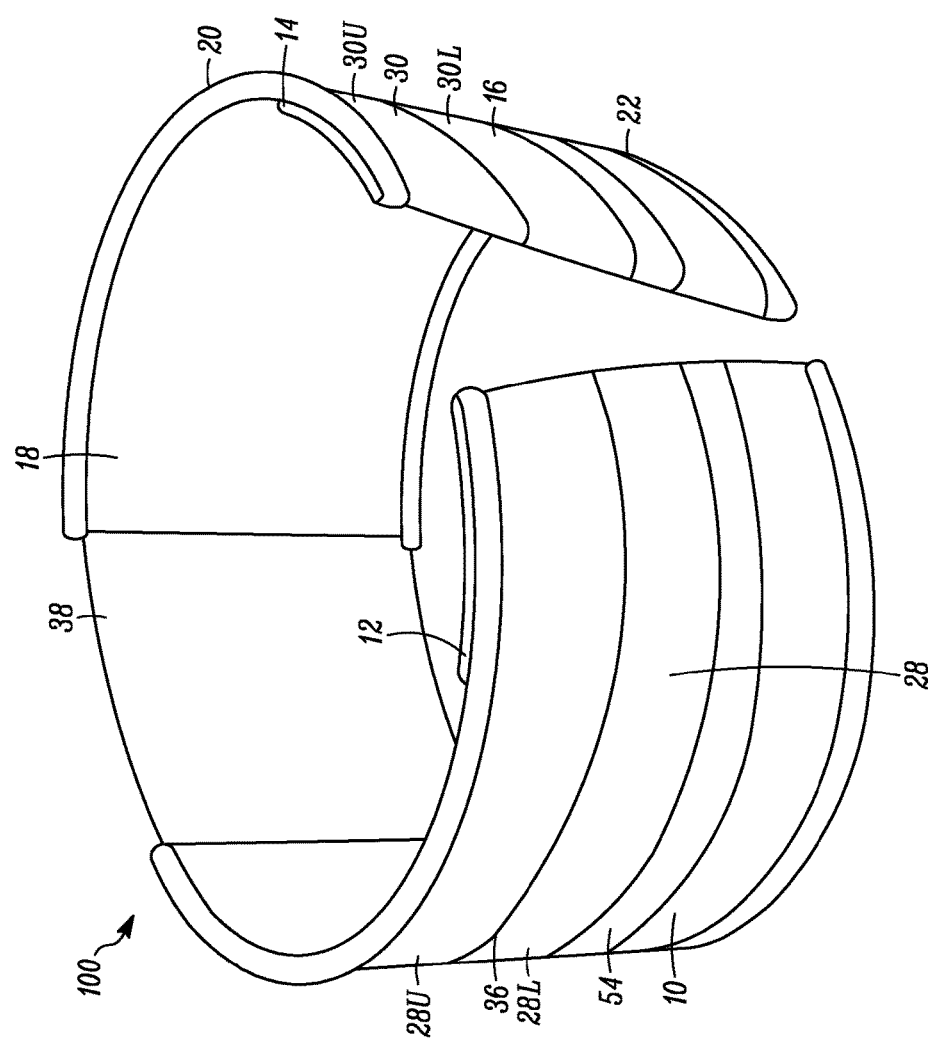
FIG. 1 shows an embodiment of a device according to the invention with the upper edge folded upwards.

Referring to FIGS. 1 to 6, an embodiment of a safety device 100 according to the invention comprises: a fabric belt 10 having a first end 12, a second end 14, a front side 16, a rear side 18, a top edge 20 and a bottom edge 22. A length is defined between the first and the second ends 12, 14. A width is defined between the top edge and the bottom edge. The length of the safety device is greater than the width of the safety device.

A fastening means first part 24 is provided on the rear side adjacent each of the first and second ends 12, 14.

A fastening means second part 26 is adapted to fasten to each first part 24. The fastening means second parts 26 are provided on the rear side 18 of the safety device 100 that faces the user in use.

The fastening means second parts 26 are spaced a distance from each of the first and the second ends 12, 14, and each end of the device 12, 14 is configured to fold so as to allow the fastening means first parts 24 and fastening means second parts 26 to fasten to each other and the said distance is selected to allow the shoulder strap of the child's seat harness to pass between the fastening means and the fold.

In the embodiment shown in FIGS. 1 to 4 the safety device 100 is configured to attach in use to the shoulder straps of a safety harness and to pass behind the back of a child restrained by the harness. For example the device may be attached to shoulder straps of a harness forming part of a buggy, high chair or car seat or any other seat or chair with safety straps or belts.

Figure 3:
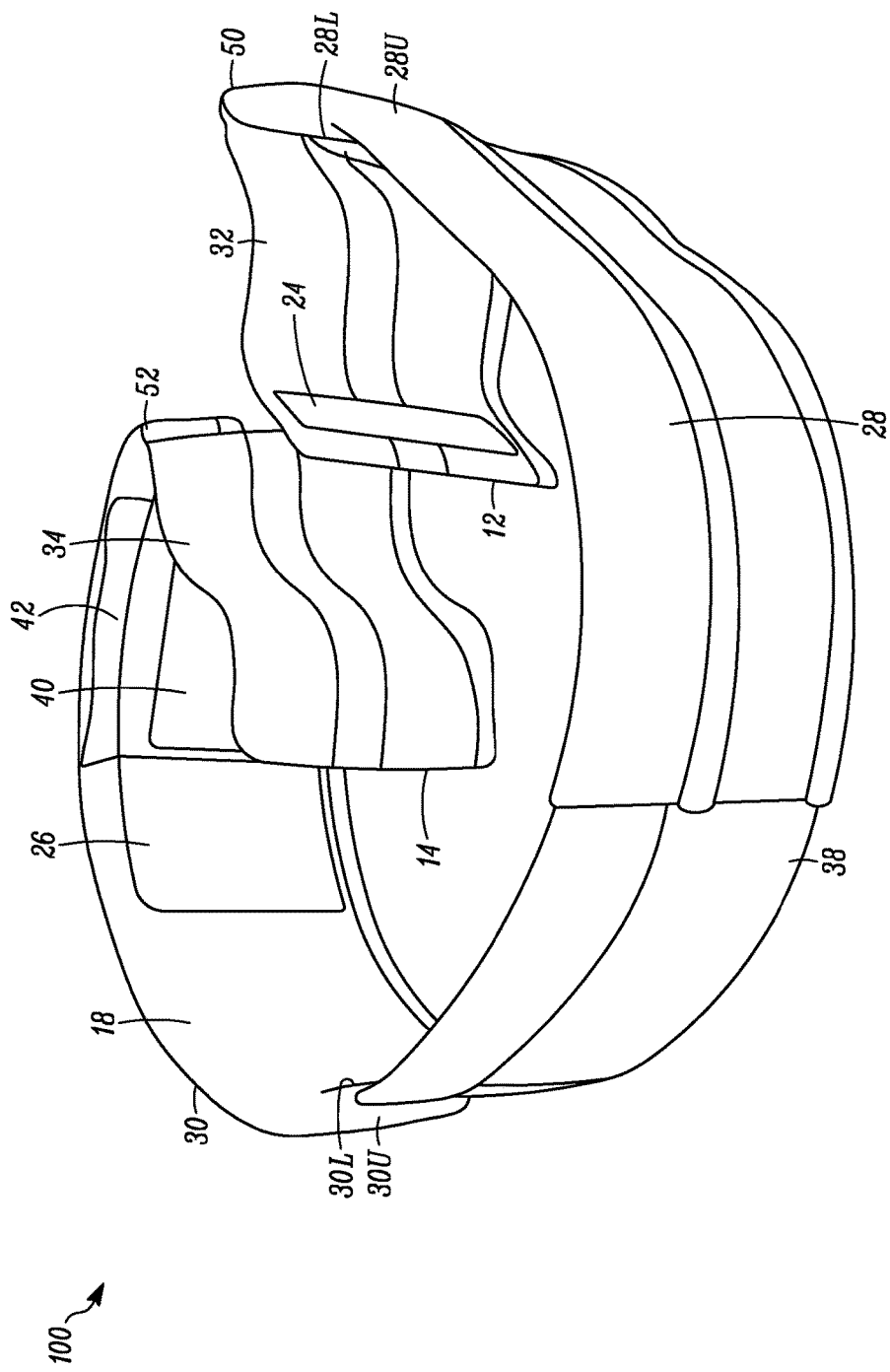
FIG. 3 shows the embodiment as in FIG. 2 with the end portions unfastened.

In the embodiment shown in FIG. 3 the fastener is a hook and fibre fastener such as Velcro® and the first part 24 is one of the hook or the eye material and the second part 26 is the other material.

As shown in FIG. 3 the device comprises a first 28 and a second 30 padded portion and two non-padded end portions 32, 34 forming each end of the safety device. The fastener first part 24 is provided adjacent each end 12, 14, and the fastener second part 26 being provided on the rear side of the padded portion 28, 30.

The length of the non-padded end portions 32, 34 is around half the distance between the fastener parts. In this way a folding point is provided by the join between the non-padded end portions 32, 34 and the padded portions 28, 30.

In the embodiment shown in FIGS. 1 to 6 the safety device comprises an elastic portion 38 extending across the whole width of the device between the two padded portions 28 and 30.

Figure 2:
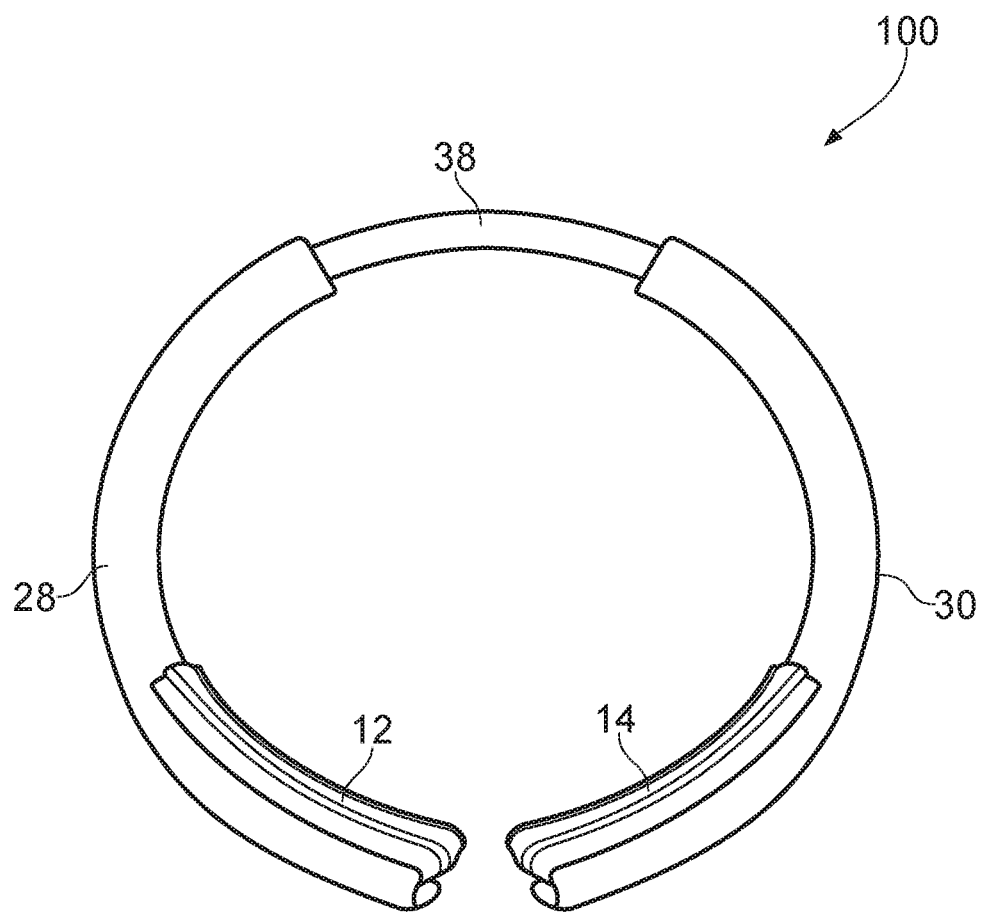
FIG. 2 shows a top view of the embodiment in FIG. 1 with the upper edge folded downwards with the end portions fastened.
Figure 4:
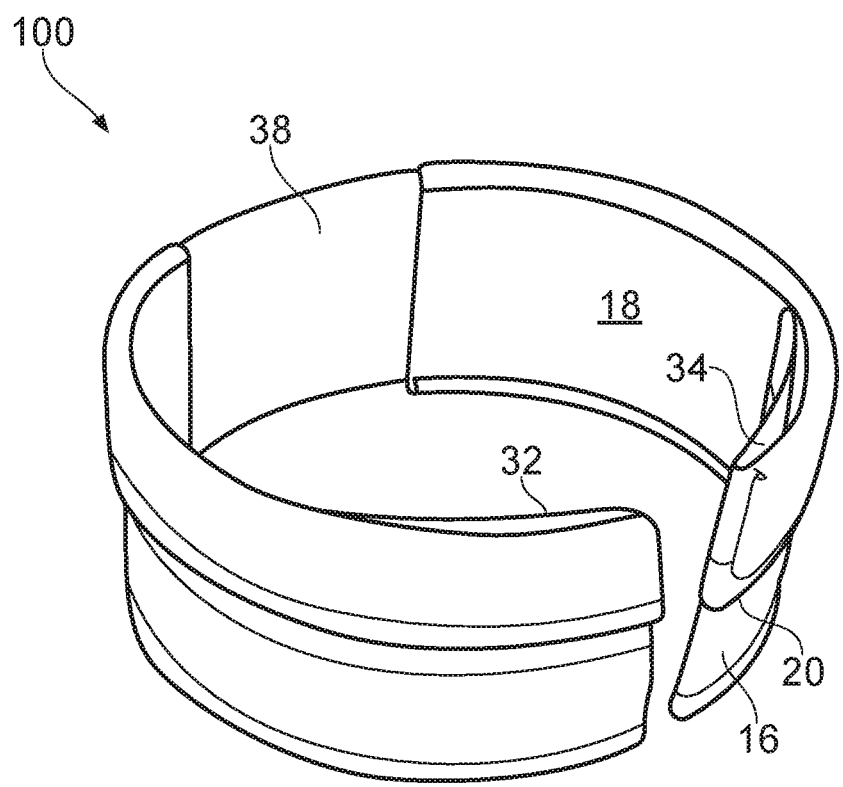
FIG. 4 shows an isometric view of the embodiment in FIG. 2.

The padded portions 28, 30 and the elastic portion 38 of the safety device are adapted to fold down at a top edge as shown in FIGS. 2 to 4 such that the top edge 20 lies adjacent to the front side 16 of the device (see FIG. 4).

In some embodiments a seam 36 is provided in parallel to and spaced apart from the top edge 20 such that the padding is divided along the seam 36 to form an upper padded region 28U, 30U and a lower padded region 28L, 30L, so as to facilitate such folding. In other embodiments the lower and upper padded regions 28L, 30L, 28U, 30U are separated parallel to the top edge 20 and joined by a strip of non-padded fabric (not shown), such that the upper padded region 28U, 30U is adapted to fold down onto the lower padded region 28L, 30L.

The safety device 100 comprises a pocket 40 having a closure flap 42, provided on the rear side 18 of each of the padded portions 28, 30 adjacent to the join with the non-padded portions 32, 34 as shown in particular in FIG. 3.

Figure 5:
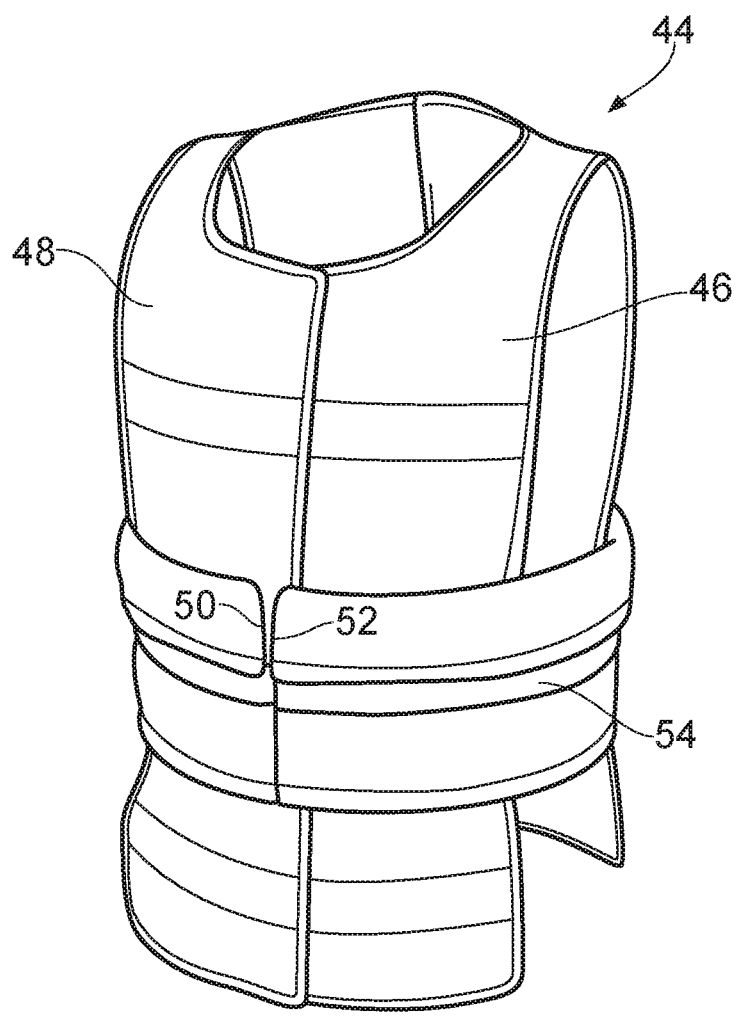
FIG. 5 shows a front three quarter view of embodiment of FIGS. 1 to 4 with a safety jacket folded out from the device.
Figure 6:
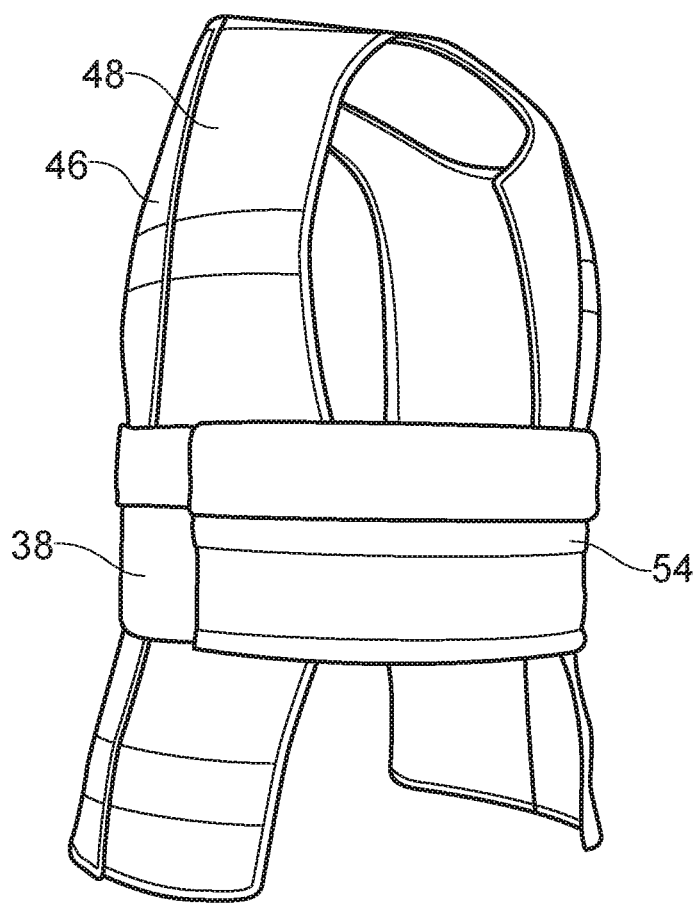
FIG. 6 shows a side view of the embodiment as shown in FIG. 5.

In the embodiment shown in FIGS. 5 and 6 the safety device comprises a high visibility vest 44 attached to the safety device and configured to be folded into and out from the pocket (not shown in FIGS. 5 and 6). The high visibility vest 44 comprises a left hand part 46 and a right hand part 48, each part being attached to the device near one of the pockets and configured to be stored within the pockets 40 (see FIG. 3).

The vest parts 46, 48 comprise fastening means such as Velcro® to join them together at the front and/or at the back. Optionally the device comprises fastening means to join the two ends of the device together to allow the device to be worn like a belt as shown in FIGS. 5 and 6. In some versions of this embodiment the fastening means are provided adjacent to the ends 50 and 52 of the padded portions 28 and 30.

In this way a high visibility article of clothing is available for the child to wear in case of an accident.

The device may be formed from a polymer fabric having inner foam padding to provide a layered breathable assembly. The device may have a high visibility, for example reflective, fabric or polymer strip provided around it, for example as shown as 54.

The elastic region 38 may be formed from an elasticated fabric. The device may comprise a patterned or coloured fabric, and may be formed from a number of fabric panels stitched and/or bonded together. The safety device may have a wipe clean surface so as to be readily cleaned and for improved durability.

The invention has been described by way of examples only and it will be appreciated that variation may be made to the above-mentioned embodiments without departing from the scope of invention. Firstly it will be understood that any features described in relation to any particular embodiment may be featured in combinations with other embodiments.

With respect to the specification therefore, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention, with variation and implementation obvious and clear on the basis of either common general knowledge or of expert knowledge in the field concerned. Further, since numerous modifications and changes will readily occur to those skilled in the art, it is not desired to limit the invention to the exact construction and operation shown and described, and accordingly, all suitable modifications and equivalents may be resorted to, falling within the scope of the invention as set out in the accompanying claims.

The invention claimed is:

1. A safety device comprising:
   an elongate belt having a first end, a second end, a front side, a rear side, a top edge and a bottom edge, a length being defined between the first end and the second end and a width being defined between the top edge and the bottom edge;
   the belt includes a first fastening means located at each of the first end and the second end, and a second fastening means located adjacent each of the first end and the second end of the belt, each of the fastening means being arranged in use to fasten each of the first end and the second end of the belt in a folded arrangement about a respective shoulder strap of a safety harness, wherein
   the first fastening means is located on the rear side adjacent each of the first end and the second end of the belt; and
   the second fastening means is adapted to releasably engage the first fastening means; the second fastening means being provided on the rear side of the belt and spaced at a distance from each of the first end and the second end of the belt; the length of the belt is greater than the width, and each of the first end and the second end of the belt is configured to fold so as to allow the first fastening means and the second fastening means to releasably engage one another, the distance being selected in order to allow the respective shoulder strap of the safety harness to pass between the respective first fastening means and second fastening means and the folded arrangement.

2. The safety device according to claim 1 which is configured to fold at a folding point around midway between the first fastening means and the second fastening means.

3. The safety device according to claim 1 further comprising one or more padded portions and a non-padded end portion forming each of the first end and the second end of the belt, the first fastening means being provided adjacent each of the first end and the second end, and the second fastening means being provided on a rear side of the one or more padded portions.

4. The safety device according to claim 1 wherein a length of the non-padded end portion is approximately half a distance between the first fastening means and the second fastening means.

5. The safety device according to claim 1 further comprising an elastic portion extending across at least part of the belt between the first end and the second end.

6. The safety device according to claim 1 wherein a padded portion of the safety device is adapted to fold down at the top edge such that the top edge lies adjacent the front side of the safety device.

7. The safety device according to claim 1 further comprising one or more pockets.

8. The safety device according to claim 7 wherein the one or more pockets are provided on the rear side of the belt.

9. The safety device according to claim 7 wherein the one or more pockets is provided at a point midway between the first fastening means and the second fastening means.

10. The safety device according to claim 7 comprising an article of clothing attached to the safety device and configured to be folded into and out from at least one of the one or more pockets.

11. The safety device according to claim 10 wherein the article of clothing has a high visibility arm-band, a high visibility vest, a high visibility tunic or a high visibility jacket.

12. The safety device according to claim 10 wherein the article of clothing is permanently attached to the safety device adjacent an opening of the one or more pockets.

13. The safety device according to claim 1 further comprising a first and a second pocket adjacent each of the first end and the second end of the belt and displaced inwards from the first end and the second end of the belt; and an article of clothing attached to the safety device and configured to be folded into and out from at least one of the one or more pockets, the article of clothing comprising a left and a right hand part, each of the left and the right hand part being attached to the safety device near one of the one or more pockets and configured to be stored within the one or more pockets.

14. The safety device according to claim 1 further comprising a further fastener means configured to allow the safety device to be worn in a manner of a belt.

15. The safety device according to claim 14 wherein the further fastener means comprises a first fastener part and a second fastener part adapted to releasably engage each other, the first fastener part and the second fastener part are each located at or adjacent an end of at least one or more padded portions forming each of the first end and the second end of the belt.

16. A method of deploying a safety device comprising the steps of:

fixing a first end and a second end of the safety device around shoulder straps so that a front of the safety device faces in a forwards direction;

folding the first end and the second end around each of the shoulder straps;

fastening together fastener parts at the first end and the second end of the safety device so that a child is able to be placed in a seat associated with the safety device with a portion of the safety device adjacent to the child's back;

fastening the shoulder straps to restrain the child within the seat; and folding an upper padded part at a top edge of the safety device so that the top edge of the safety device is adjacent to the front in order to adjust a width of the safety device.

* * * * *